A. KUEHN.
SPRING MOUNTING FOR BICYCLE WHEELS.
APPLICATION FILED APR. 9, 1913.
1,130,828.
Patented Mar. 9, 1915.
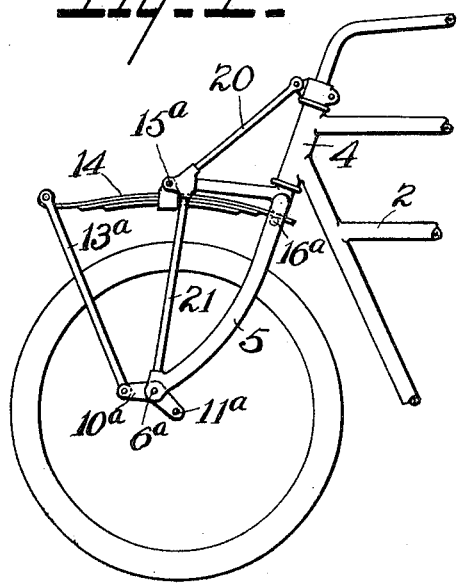
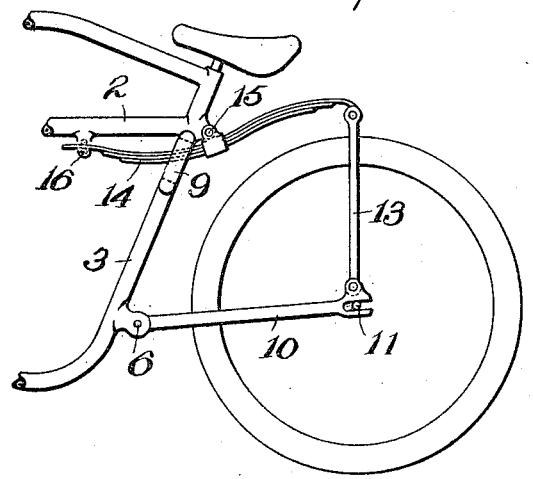
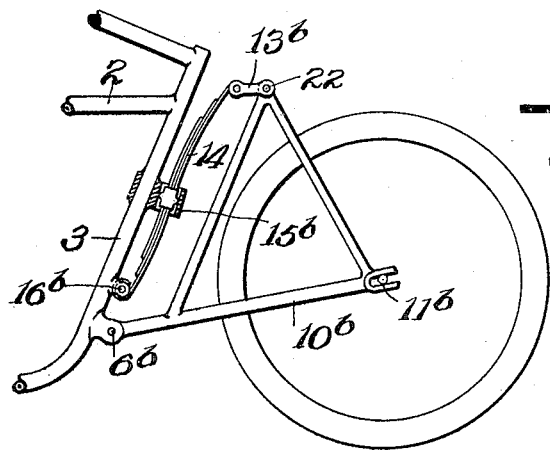
Alfred Kuehn, Inventor

UNITED STATES PATENT OFFICE.

ALFRED KUEHN, OF MILWAUKEE, WISCONSIN.

SPRING-MOUNTING FOR BICYCLE-WHEELS.

1,130,828.      Specification of Letters Patent.      Patented Mar. 9, 1915.

Application filed April 9, 1913. Serial No. 759,854.

*To all whom it may concern:*

Be it known that I, ALFRED KUEHN, a subject of the Emperor of Germany, residing at Milwaukee, in the county of Milwaukee and State of Wisconsin, have invented certain new and useful Improvements in Spring-Mountings for Bicycle-Wheels, of which the following is a specification.

My invention relates to bicycles, and particularly to wheel mountings therefor; and it consists in providing in connection with swingingly attached wheel carrier members a simple spring mechanism for satisfactorily controlling the swinging movement of said wheel carriers so as to effectively absorb the road strains and insure ease to the rider.

The invention is fully described in connection with the accompanying drawing and is particularly pointed out in the claim.

Figure 1 is a side elevation of the front portion of a bicycle, showing my invention applied to the front wheel thereof; Fig. 2 is a similar view of the rear portion showing its application to the rear wheel; and Fig. 3 is a similar view to Fig. 2 showing a modified application of the invention.

The main bicycle frame indicated is of the ordinary diamond type, comprising the usual horizontal frame member 2, a rear seat post 3, and a front steering head 4; and the front fork 5 is itself a rigid structure carried by the front wheel, though rotatably mounted in said steering head as usual.

Both the front and rear wheels are directly carried by swinging members which are pivotally attached respectively to the rigid wheel-carried fork portion 5 and to the rigid main frame; the pivotal connection of the swinging rear wheel carrier members 10 to the latter being at the lower portion 6 of the seat post 3 as indicated, while the swinging front wheel carrier members 10$^a$ are pivoted at 6$^a$ to the lower ends of the front fork 5; and the wheels being suitably mounted at the swinging ends 11 and 11$^a$ respectively of said pivoted carrier members 10 and 10$^a$.

My invention relates to the improved spring connection of these swinging wheel carrier members to the rigidly constructed portions of the machine directly carried by the respective wheels; and consists essentially in the adaptation of an intermediately pivoted spring 14 to this use, in such manner as to effectively control the swing of the hinged wheel carrier members and provide a very simple and satisfactory construction. To this end the rigid wheel carried portions of the machine are provided with separate suitably located spring supports, as shown at 15 and 16 on the main frame post member 3, and at 15$^a$ and 16$^a$ of the rigid front fork 5; these supports being adapted respectively for pivotally supporting said spring 14 intermediately of its length, and for engaging one of its ends; the other spring end being suitably connected to the swinging members 10 or 10$^a$, so as to control their movement.

As shown in Fig. 2 the intermediate support 15 for the spring, is formed on the frame post 3, while the end support 16 therefor is formed on the horizontal frame member 2, forward of the support 15; the spring being thus mounted on the frame in approximately horizontal position, and extending through a forked portion or opening 9 of the frame post as indicated. The spring is pivotally connected about midway of its length, to the support 15, and its forward end is slidably engaged in the support 16 as indicated so as to provide for the extension and contraction, in service, of the length of the spring 14; while the rear end is similarly connected to the swinging carrier arms 10, by means of links 13 as indicated. The application of the spring 14 to similarly control the swing of the front wheel is effected, as indicated, by providing braces 20, 21 extending from the top and bottom portions respectively of the rigid fork portion 5, to the intermediate spring support 15$^a$.

As shown in Fig. 3 both the intermediate spring support 15$^b$ and the end support 16$^b$, are represented as provided on the post 3, so that the spring, when pivotally engaged in the support 15$^b$, will be in approximately vertical position behind the post 3. One end of the spring is shown directly pivoted to the other support 16$^b$, while the other end is connected by short links 13$^b$ to the raised pivotal point 22 of the triangularly formed carrier members; the slidable engagement of the intermediate portion of the spring in the support 15$^b$, and the connecting links 13$^b$ at the one end thereof, permitting of the lengthening and shortening of the spring in service. This approximately vertical arrangement of the spring may obviously be also applied to the front of the machine, the spring in such case being divided so as to extend along each of the fork members.

The spring 14 may be conveniently built up of two or more plates, with the end portions reversely curved, as indicated; the normal weight carried, and any direct shocks taken by the rear wheel, tending to force the leaves into closer contact, while the reaction will be absorbed by a reverse yielding the the spring, so as to insure easy riding. The spring 14, mounted at two points on the fixed supports of the frame, gives proper lateral stiffness to the vertically swinging wheel carrier mechanism.

What I claim is:—

A bicycle comprising a rigid wheel-carried portion provided with spaced apart spring supports, swinging wheel carrier members pivotally connected to said rigid wheel-carried portion, and a spring intermediately pivoted in one of said spaced supports and having an end portion engaged in the other of said spaced supports and its opposite end attached to said swinging carrier members.

In testimony whereof I affix my signature in presence of two witnesses.

ALFRED KUEHN.

Witnesses:
J. A. PHILLIPS,
OTTO B. KLAUS.

Copies of this patent may be obtained for five cents each, by addressing the "Commissioner of Patents, Washington, D. C."